(12) United States Patent
Eloy et al.

(10) Patent No.: US 10,864,815 B2
(45) Date of Patent: Dec. 15, 2020

(54) METHOD FOR DETECTING COMBUSTION IRREGULARITIES OF AN INTERNAL COMBUSTION ENGINE UNIT COUPLED TO AN ELECTRIC PROPULSION UNIT, OF A HYBRID MOTOR VEHICLE

(71) Applicants: Continental Automotive France, Toulouse (FR); Continental Automotive GmbH, Hannover (DE)

(72) Inventors: Stéphane Eloy, Tournefeuille (FR); Nathalie Raud, Plaisance du Touch (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 16/485,614

(22) PCT Filed: Mar. 14, 2018

(86) PCT No.: PCT/FR2018/050603
§ 371 (c)(1),
(2) Date: Aug. 13, 2019

(87) PCT Pub. No.: WO2018/172664
PCT Pub. Date: Sep. 27, 2018

(65) Prior Publication Data
US 2019/0366833 A1    Dec. 5, 2019

(30) Foreign Application Priority Data
Mar. 24, 2017    (FR) ...................................... 17 52461

(51) Int. Cl.
*B60K 6/485*    (2007.10)
*B60W 10/06*    (2006.01)
(Continued)

(52) U.S. Cl.
CPC ............. *B60K 6/485* (2013.01); *B60W 10/06* (2013.01); *B60W 10/08* (2013.01); *B60W 20/50* (2013.01);
(Continued)

(58) Field of Classification Search
USPC ....................................................... 701/29.2
See application file for complete search history.

(56) References Cited

U.S. PATENT DOCUMENTS 6,131,538 A    10/2000  Kanai
10,323,618 B1 *  6/2019  Dudar ................... F02P 5/1526
(Continued)

FOREIGN PATENT DOCUMENTS

CN    202657023 U    1/2013
DE    102007043607 A1    3/2009
(Continued)

OTHER PUBLICATIONS

English Translation of the Written Opinion for International Application No. PCT/FR2018/050606, dated Jun. 7, 2018, 6 pages.
(Continued)

*Primary Examiner* — Tyler D Paige
(74) *Attorney, Agent, or Firm* — RatnerPrestia

(57) ABSTRACT

A method for detecting combustion irregularities in a combustion engine coupled to an electric engine of a hybrid vehicle having a management unit for determining the respective powers to be supplied by these engines, and for delivering setpoint data dependent on these power distributions, including determining a threshold value corresponding to a percentage of the power supplied by the electric engine, such that values of this percentage less than or equal to the threshold value correspond to operation of the electric engine that is not liable to falsify the results of the combustion irregularity detection diagnostics, and, for the purpose
(Continued)

of launching a diagnostic procedure, when the percentage of the power supplied by the electric engine is greater than the threshold value, delivering setpoint data suitable for fixing the value of the power percentage at a setpoint value less than the threshold.

7 Claims, 2 Drawing Sheets

(51) Int. Cl.
*B60W 10/08* (2006.01)
*B60W 20/50* (2016.01)
*B60W 50/02* (2012.01)

(52) U.S. Cl.
CPC . *B60W 50/0205* (2013.01); *B60W 2510/0666* (2013.01); *B60W 2510/085* (2013.01); *B60W 2710/0677* (2013.01); *B60W 2710/086* (2013.01)

(56) References Cited

U.S. PATENT DOCUMENTS

| | | | |
|---|---|---|---|
| 2001/0029424 A1 | 10/2001 | Iwamoto et al. | |
| 2012/0072060 A1* | 3/2012 | Zettel | B60W 10/06 701/22 |
| 2012/0203413 A1* | 8/2012 | Eisele | B60W 10/08 701/22 |
| 2013/0204476 A1 | 8/2013 | Zink et al. | |
| 2013/0261859 A1 | 10/2013 | Sugimoto | |
| 2014/0067179 A1 | 3/2014 | Amano et al. | |
| 2015/0006009 A1 | 1/2015 | Okada et al. | |
| 2015/0032326 A1* | 1/2015 | Fushiki | F02D 41/22 701/32.1 |
| 2015/0144077 A1 | 5/2015 | Rimkus | |
| 2018/0073457 A1* | 3/2018 | Dudar | F02D 41/222 |

FOREIGN PATENT DOCUMENTS

| | | |
|---|---|---|
| DE | 102011108226 A1 | 1/2013 |
| EP | 0882887 A2 | 12/1998 |
| EP | 2657057 A1 | 10/2013 |
| EP | 2810837 A1 | 12/2014 |
| JP | 2001271695 A | 1/2001 |
| JP | 2001317402 A | 11/2001 |
| JP | 2006194124 A | 7/2006 |
| JP | 2007118764 A | 5/2007 |
| JP | 2007290663 A | 11/2007 |
| JP | 2008143321 A | 6/2008 |
| JP | 2010179712 A | 8/2010 |
| KR | 20130088910 A1 | 8/2013 |
| WO | 2013084705 A1 | 6/2013 |
| WO | 2013136159 A1 | 9/2013 |

OTHER PUBLICATIONS

International Search Report and Written Opinion for International Application No. PCT/FR2018/050603, dated Jun. 7, 2018—9 pages.

* cited by examiner

METHOD FOR DETECTING COMBUSTION IRREGULARITIES OF AN INTERNAL COMBUSTION ENGINE UNIT COUPLED TO AN ELECTRIC PROPULSION UNIT, OF A HYBRID MOTOR VEHICLE

CROSS REFERENCE TO RELATED APPLICATIONS

This application is the U.S. National Phase Application of PCT International Application No. PCT/FR2018/050603, filed Mar. 14, 2018, which claims priority to French Patent Application No. 1752461, filed Mar. 24, 2017, the contents of such applications being incorporated by reference herein.

FIELD OF THE INVENTION

The invention relates to a method for detecting combustion irregularities in an internal combustion engine unit, called a combustion engine, coupled to an electric propulsion unit, called an electric engine, of a hybrid motor vehicle having a management unit designed to determine the respective powers to be supplied by each of said combustion engine and electric engine, and to deliver to said engines setpoint data dependent on these power distributions. Furthermore, as is conventional, these setpoint data are calculated, such that the operating point of the combustion engine is optimum and corresponds to an optimum efficiency thereof, leading to its consumption and the emission of pollutants being limited.

BACKGROUND OF THE INVENTION

During the operation of a vehicle having a combustion engine, known strategies are deployed in order to determine malfunctions, such as combustion misfires, of this combustion engine.

In the case of vehicles propelled only by a combustion engine, these strategies prove to be reliable and make it possible to detect malfunctions and to implement preventive measures dependent on the nature and the severity of the detected anomalies. Thus, by way of example, combustion misfires manifest themselves in knocks that allow them to be easily identified and corrected.

By contrast, in the case of hybrid vehicles having a combustion engine coupled to an electric engine, and whose torque is distributed between the two propulsion sources at all times, the strategies for detecting malfunctions prove ineffective, as the electric engine contributes to obtaining the total torque, and is thus able to compensate for malfunctions of the combustion engine.

SUMMARY OF THE INVENTION

An aspect of the present invention aims to mitigate these drawbacks inherent to hybrid vehicles having a combustion engine coupled to an electric engine, and provide a method for detecting combustion irregularities in the combustion engine of such hybrid vehicles.

An aspect of the invention thus targets a method for detecting combustion irregularities in an internal combustion engine unit, called a combustion engine, coupled to an electric propulsion unit, called an electric engine, of a hybrid motor vehicle having a management unit designed to determine the respective powers $P_{Mth}$ and $P_{Me}$ to be supplied by each of said combustion engine and electric engine, and to deliver to said engines setpoint data dependent on these power distributions, and, according to an aspect of the invention, this method comprises:

a/ in a preliminary phase, determining a threshold value S1 corresponding to a value of the percentage % $P_{Me} = P_{Me}/(P_{Me}+P_{Mth})$ of the power supplied by the electric engine, such that values of % PMe less than or equal to S1 correspond to operation of said electric engine that is not liable to falsify the results of the combustion irregularity detection diagnostics, b/ for the purpose of launching, at a time t=T1, a combustion irregularity detection diagnostic procedure, comparing, with the threshold value S1, the value of the percentage % $P_{Me}$ of the power supplied by the electric engine, determined by the setpoint data, and:

b1/ when the percentage % $P_{Me}$ of the power supplied by the electric engine is less than or equal to the threshold value S1:

b1.1/ delivering setpoint data suitable for fixing the value of said power percentage at a setpoint value S2, such that $0 \leq S2 \leq S1 \leq +\Delta S1$, where $S1+\Delta S1$ is the maximum value of the threshold value S1 beyond which the operation of the electric engine falsifies the results of the combustion irregularity detection diagnostics, b1.2/ launching the diagnostic procedure, b1.3/ re-establishing a nominal hybrid operating mode at the end of the diagnostic procedure, b2/ when the percentage % $P_{Me}$ of the power supplied by the electric engine remains greater than the threshold value S1 for a predetermined time interval $t=T2-T1$, where $T2>T1$, delivering setpoint data suitable for fixing the value of said power percentage at the setpoint value S2, and then launching the diagnostic procedure, and re-establishing a nominal hybrid operating mode at the end of said diagnostic procedure.

The method according to an aspect of the invention therefore comprises, during a command to execute a combustion irregularity detection diagnostic procedure, reducing the percentage % $P_{Me}$ of the power supplied by the electric engine to a setpoint value S2, this reduction being performed either immediately when the percentage % $P_{Me}$ of the power supplied by the electric engine is less than or equal to a threshold value S1, or in a forced manner after a predetermined time interval T2−T1 when said percentage % $P_{Me}$ remains greater than said threshold value S1 during this time interval.

This method thus comprises, in order to guarantee the reliability of the combustion irregularity detection diagnostic procedures for combustion engines coupled to electric engines, reducing the power supplied by the electric engine while these procedures are taking place so as to obtain an operating point of the combustion engine/electric engine torque at which the operation of said electric engine is not liable to falsify the results of the combustion irregularity detection diagnostics.

On the basis of this principle, the threshold value S1 may be determined in such a way as to guarantee minimum degradation of the operation of the combustion engine Mth during the execution of the diagnostic procedures. However, advantageously according to an aspect of the invention, one solution comprises determining a threshold value, corresponding to a value of the percentage % $P_{Me}$ of the power supplied by the electric engine, at least substantially equal to 10%.

The setpoint value S2, for its part, makes it possible to determine the power effectively supplied by the electric engine while the combustion irregularity detection diagnostic procedures are taking place. This settable setpoint value may be selected over a range of values between:
- zero: value at which in particular the reliability of the combustion irregularity detection diagnostic procedures is optimum, but the risks of excess emission of pollutants are increased in the case of a change in the setpoint data while the diagnostic procedures are taking place
- a maximum value corresponding to operation of the electric engine that leads to maximum admissible interference, maximum value at which in particular the risks of emission of pollutants are minimal.

This setpoint value S2 may also advantageously be selected so as to have a value at least substantially equal to the threshold value S1.

Moreover, according to another advantageous mode of implementation of the invention, the launches of the irregularity detection diagnostic procedures are commanded periodically with a predetermined period T1.

BRIEF DESCRIPTION OF THE DRAWINGS

Other features, aims and advantages of aspects of the invention will emerge from the following detailed description with reference to the appended drawings showing, by way of non-limiting example, one preferred mode of implementation thereof. In these drawings.

DETAILED DESCRIPTION OF THE PREFERRED EMBODIMENTS

Figure 1:
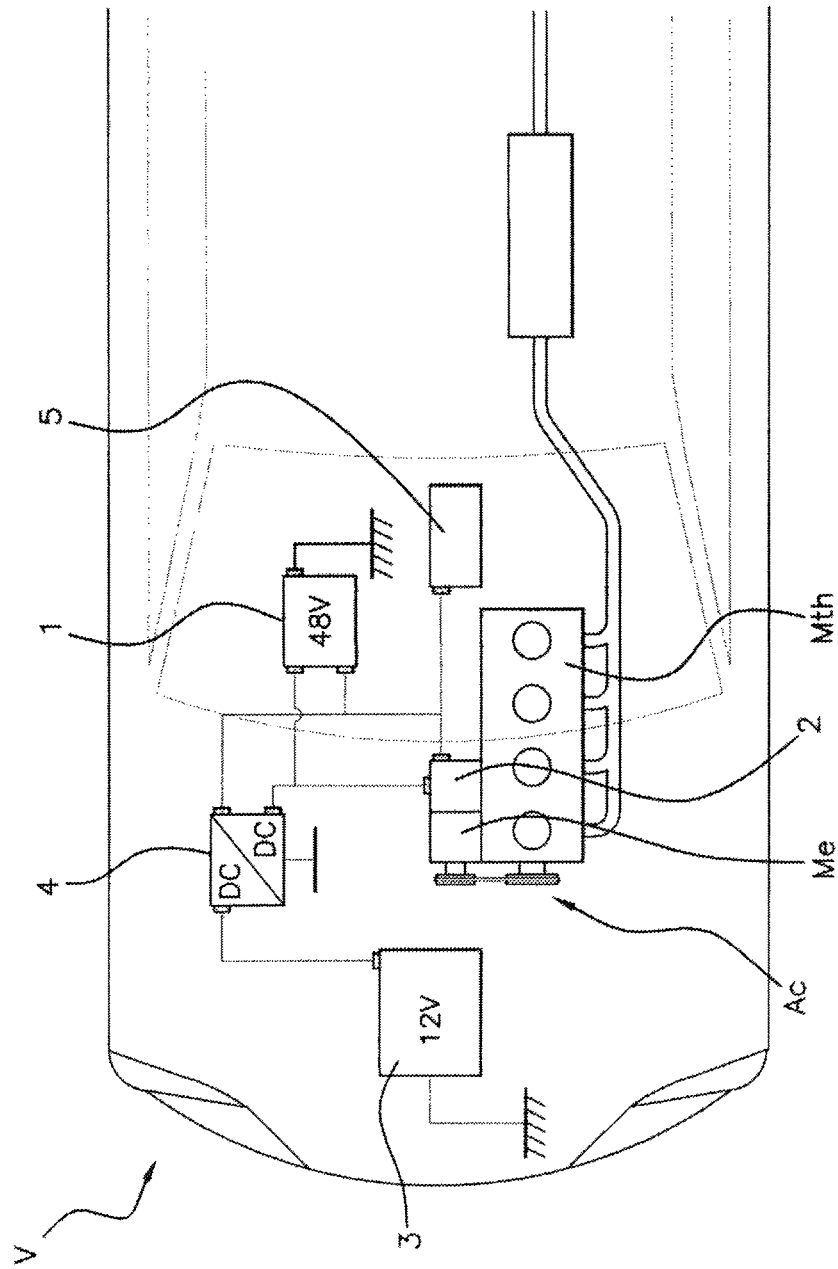
FIG. 1 is a schematic plan view of a hybrid vehicle allowing the method according to an aspect of the invention for detecting combustion irregularities in a combustion engine to be implemented.
Figure 2:
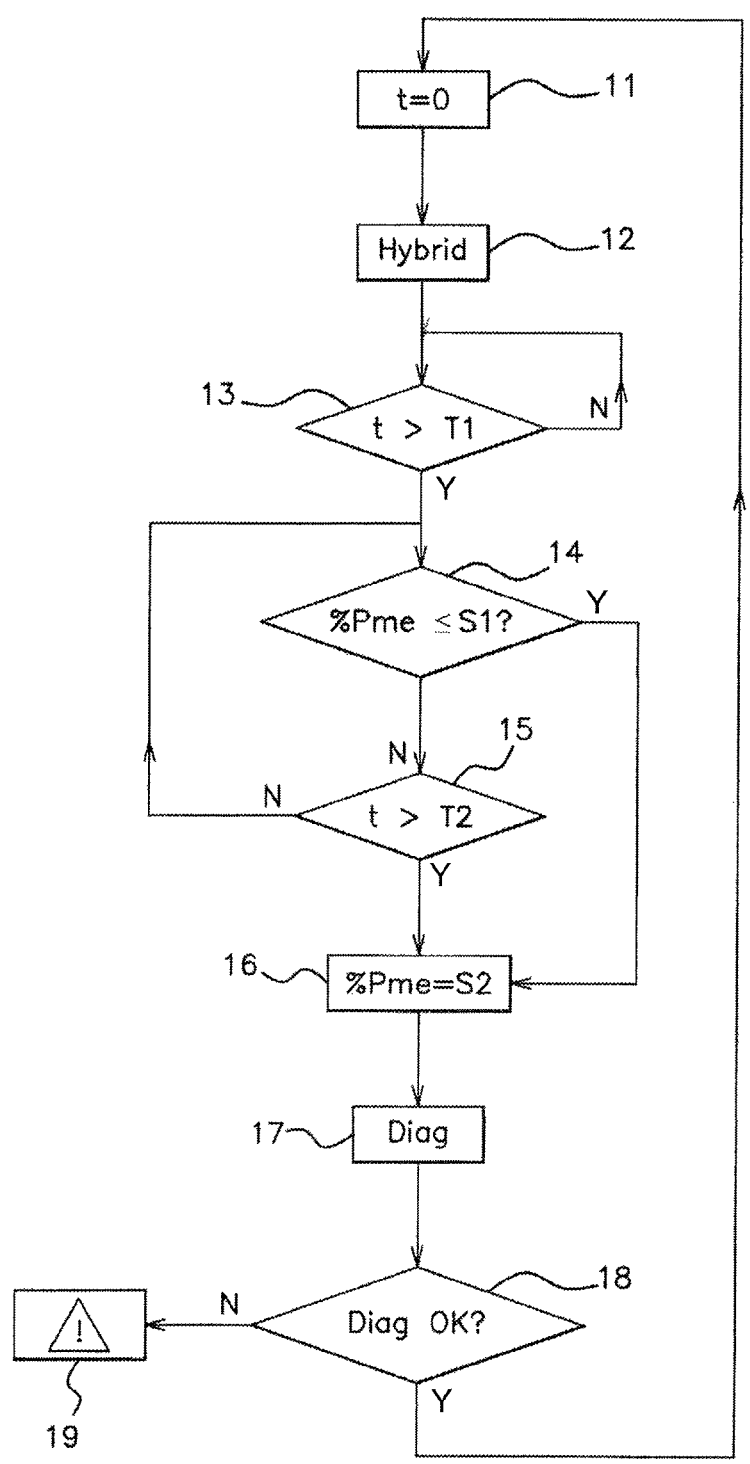
FIG. 2 shows a flowchart of an example of this detection method.

The method according to an aspect of the invention, the flowchart of which is shown in FIG. 2, is implemented for the purpose of detecting combustion irregularities in a combustion engine Mth mounted in a hybrid vehicle V shown in FIG. 1, comprising an electric engine Me Coupled to said combustion engine by a system Ac for transmitting the engine torque.

This hybrid vehicle V has a first DC voltage source 1 integrated into a primary circuit comprising a DC-to-AC converter 2 for supplying power to the electric engine Me.

This hybrid vehicle V also has a secondary circuit connected to the primary circuit by way of a DC-to-DC voltage converter 4 supplied by a second DC voltage source 3.

As is conventional, the first voltage source 1 consists of a high-voltage battery or group of high-voltage batteries, for example a lithium-ion battery or Ni-MH battery, delivering for example a nominal voltage of 48 volts, and the second voltage source 3 consists of a low-voltage battery, such as for example a lead battery delivering a nominal voltage substantially equal to 12 volts.

This hybrid vehicle V lastly has control electronics or a management unit (not shown) having in particular a supervisor designed in particular to:
- determine, at all times, the power or the torque to be supplied by the combustion engine Mth and the electric engine Me, and to deliver to said engines setpoint data dependent on these distributions,
- manage the implementation of the method according to an aspect of the invention for detecting potential combustion irregularities in the combustion engine Mth.

According to the flowchart shown in FIG. 2, the method according to an aspect of the invention starts with a step 11, t=0, of triggering a digital clock that is initiated (step 12) during an operating regime in hybrid mode.

Following this time initialization, after a time interval T1, for example of the order of 15 minutes, has elapsed, materialized by step 13, the following step (step 14) comprises comparing the value of the percentage % $P_{Me} = P_{Me}/(P_{Me} + P_{Mth})$ of the power supplied by the electric engine Me, determined by the setpoint values, with a calibrated threshold value S1, for example of the order of 10%; this threshold value S1 corresponding to a value of the percentage % Pme=Pme/(PMe+PMth) of the power supplied by the electric engine Me such that values of % Pme≤S1 correspond to operation of the electric engine that is not liable to falsify the results of the combustion irregularity detection diagnostics.

When the percentage % $P_{Me}$, representative of the power determined by the setpoint data, is less than or equal to the threshold S1, the following step, step 16, comprises assigning the value of a set setpoint value S2 to this percentage % $P_{Me}$, and then launching a conventional diagnostic procedure for detecting combustion irregularities in the combustion engine Mth (step 17).

This setpoint value S2, which makes it possible to determine the power effectively supplied by the electric engine Me while the diagnostic procedures are taking place, is selected in a range of values [0−S1+ΔS1], S1+ΔS1 consisting of the maximum value of the threshold value S1 beyond which the operation of the electric engine Me falsifies the results of the combustion irregularity detection diagnostics.

In this range of values, the setpoint value S2 may in particular be selected so as to have the value of the threshold S1.

When, in step 14, the percentage % $P_{Me}$ proves to be greater than the threshold value S1, this step 14 is repeated until a time interval T2, for example equal to 30 minutes, has elapsed (step 15), at the end of which step 16 and step 17 of launching a diagnostic procedure are performed in succession.

The diagnostic procedure initiated after step 16 is conventionally intended to detect combustion irregularities in the combustion engine Mth, in particular combustion misfires or partial combustions, using any known method, and, at the end of this procedure, the analysis of the results performed in step 18 leads:
- in the presence of anomalies, to the implementation of preventive measures (step 19) dependent on the nature and the severity of said anomalies: storing the anomalies in memory, commanding operation of the combustion engine Mth in downgraded mode, etc., and in all cases, possible triggering of means for alerting the driver,
- in the absence of an anomaly, simultaneously to the establishment of an operating regime in hybrid mode (step 12) and to the initialization of the triggering of the clock (step 11).

The method according to an aspect of the invention therefore makes it possible to diagnose combustion misfires representative of a malfunction of the combustion engine, which in particular generate pollution, and which are masked when conventional detection strategies are implemented due to the operation of the electric engine.

The invention claimed is:

1. A method for detecting combustion irregularities in an internal combustion engine unit, called a combustion engine, coupled to an electric propulsion unit, called an electric engine, of a hybrid motor vehicle having a management unit designed to determine the respective powers $P_{Mth}$ and $P_{Me}$ to be supplied by each of said combustion engine and electric engine, and to deliver to said engines setpoint data dependent on these power distributions, said method comprising:
   in a preliminary phase, determining using control electronics a threshold value S1 corresponding to a value of the percentage % $P_{Me}=P_{Me}/(P_{Me}+P_{Mth})$ of the power supplied by the electric engine, such that values of % PMe less than or equal to S1 correspond to operation of said electric engine that is not liable to falsify the results of the combustion irregularity detection diagnostics, namely leading to a maximum admissible interference,
   for the purpose of launching, at a time t=T1, a combustion irregularity detection diagnostic procedure, comparing using the control electronics, with the threshold value S1, the value of the percentage % $P_{Me}$ of the power supplied by the electric engine, determined by the setpoint data, and:
      when the percentage % $P_{Me}$ of the power supplied by the electric engine is less than or equal to the threshold value S1:
         delivering setpoint data suitable for fixing the value of said power percentage at a setpoint value S2, such that 0≤S2≤S1+ΔS1, where S1+ΔS1 is the maximum value of the threshold value S1 beyond which the operation of the electric engine falsifies the results of the combustion irregularity detection diagnostics,
         launching the diagnostic procedure to detect combustion irregularities in the combustion engine, the combustion irregularities including combustion misfires or partial combustions,
         re-establishing a nominal hybrid operating mode at the end of the diagnostic procedure,
      when the percentage % $P_{Me}$ of the power supplied by the electric engine remains greater than the threshold value S1 for a predetermined time interval t=T2−T1, where T2>T1, delivering setpoint data suitable for fixing the value of said power percentage at the setpoint value S2, and then launching the diagnostic procedure to detect combustion irregularities in the combustion engine, the combustion irregularities including combustion misfires or partial combustions, and re-establishing the nominal hybrid operating mode at the end of the diagnostic procedure,
   wherein in each case the re-establishing of the nominal hybrid operating mode at the end the diagnostic procedure comprises, when combustion irregularities are detected, implementation of preventive measures dependent on a nature and severity of said combustion irregularities, including optionally alerting a driver.

2. The detection method as claimed in claim 1, wherein the launches of the irregularity detection diagnostic procedures are commanded periodically with a predetermined period T1.

3. The detection method as claimed in claim 1, wherein a setpoint value S2 is selected so as to be at least substantially equal to the threshold value S1.

4. The detection method as claimed in claim 1, wherein a setpoint value S1 at least substantially equal to 10% is selected.

5. The detection method as claimed in claim 2, wherein a setpoint value S2 is selected so as to be at least substantially equal to the threshold value S1.

6. The detection method as claimed in claim 2, wherein a setpoint value S1 at least substantially equal to 10% is selected.

7. The detection method as claimed in claim 3, wherein a setpoint value S1 at least substantially equal to 10% is selected.

* * * * *